United States Patent
Ochi et al.

(10) Patent No.: US 7,388,850 B2
(45) Date of Patent: Jun. 17, 2008

(54) COMMUNICATION SYSTEM, COMMUNICATION CONTROLLING METHOD, COMMUNICATION NODE, COMMUNICATION MEDIATOR NODE, COMMUNICATION MEDIATING PROGRAM, SESSION MOVING METHOD, AND SESSION MOVING PROGRAM

(75) Inventors: Daisuke Ochi, Yokohama (JP); Ken Igarashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1045 days.

(21) Appl. No.: 10/358,344

(22) Filed: Feb. 5, 2003

(65) Prior Publication Data
US 2003/0161331 A1 Aug. 28, 2003

(30) Foreign Application Priority Data
Feb. 6, 2002 (JP) ............................ P2002-030041

(51) Int. Cl.
*H04Q 7/00* (2006.01)
(52) U.S. Cl. ...................................... 370/331; 709/228
(58) Field of Classification Search ...................... None
See application file for complete search history.

(56) References Cited

U.S. PATENT DOCUMENTS

| | | | | |
|---|---|---|---|---|
| 6,625,135 B1 * | 9/2003 | Johnson et al. | ............. | 370/332 |
| 6,635,135 B2 * | 10/2003 | Kuen et al. | ................. | 156/199 |
| 6,963,582 B1 * | 11/2005 | Xu | ............................. | 370/466 |
| 7,042,879 B2 * | 5/2006 | Eschbach et al. | ........... | 370/392 |

2001/0014917 A1 8/2001 Ishiyama et al.

FOREIGN PATENT DOCUMENTS

WO WO 01/72110 10/2001

OTHER PUBLICATIONS

Henning Schulzrinne, et al., "Application-Layer Mobility Using SIP", IEEE Service Portability and Virtual Customer Environments, XP-010551460, Dec. 2000, pp. 29-36.
Charles E. Perkins, "Mobile IP", IEEE Communications Magazine, vol. 35, No. 5, XP-000657114, May 1, 1997, pp. 84-86 and 91-99.

(Continued)

*Primary Examiner*—Robert W. Wilson
(74) *Attorney, Agent, or Firm*—Oblon, Spivak, McClelland, Maier & Neustadt, P.C.

(57) ABSTRACT

An object is to ensure reachability of data even with movement of a session between communication nodes. A home node HN-1 generates a home session address HSA-1 and establishes a session with communication correspondent 90. On the occasion of movement of the session, the home node HN-1 notifies a foreign node FN-1 that it desires to move the session to the foreign node FN-1. The foreign node FN-1 internally generates an IP address HSA-1, copies a state of the session in the home node HN-1, and thereafter notifies a communication mediator node 1 of correspondence update information "HSA-1→HNA-2" in order to let the communication mediator node 1 pass data addressed to HSA-1 to a home node identification address HNA-2 by tunneling. The communication mediator node 1 passes the data to HNA-2 by tunneling on the basis of the correspondence update information and another communication mediator node 2 again passes the data to a care-of address CoA-2 by tunneling.

14 Claims, 11 Drawing Sheets

OTHER PUBLICATIONS

Thierry Ernst, et al., "Mobile Networks Support in Mobile IPv6 (Prefix Scope Binding Updates)", http://www.watersprings.org/pub/id/draft-ernst-mobile-v6-network-02.txt, XP-002294143, Jun. 22, 2001, pp. 1-24.

Xun Qu, et al., "A Moble TCP Socket", http://www.CS.ANU.EDU.AU/TECHREPORTS/1997/TR-CS-97-08.PDF, XP-002294144, Apr. 1997, pp. 1-24.

Alex C. Snoeren, et al., "An End-to-End Approach to Host Mobility", Proceedings of the Annual International Conference on Mobile Computing and Networking, XP-002286278, Aug. 2000, pp. 1-12.

David A. Maltz, et al., "MSOCKS: An Architecture for Transport Layer Mobility", INFOCOM '98, Seventeenth Annual Joint Conference of the IEEE Computer and Communications Societies, XP-010270326, Mar. 29, 1998, pp. 1037-1045.

* cited by examiner

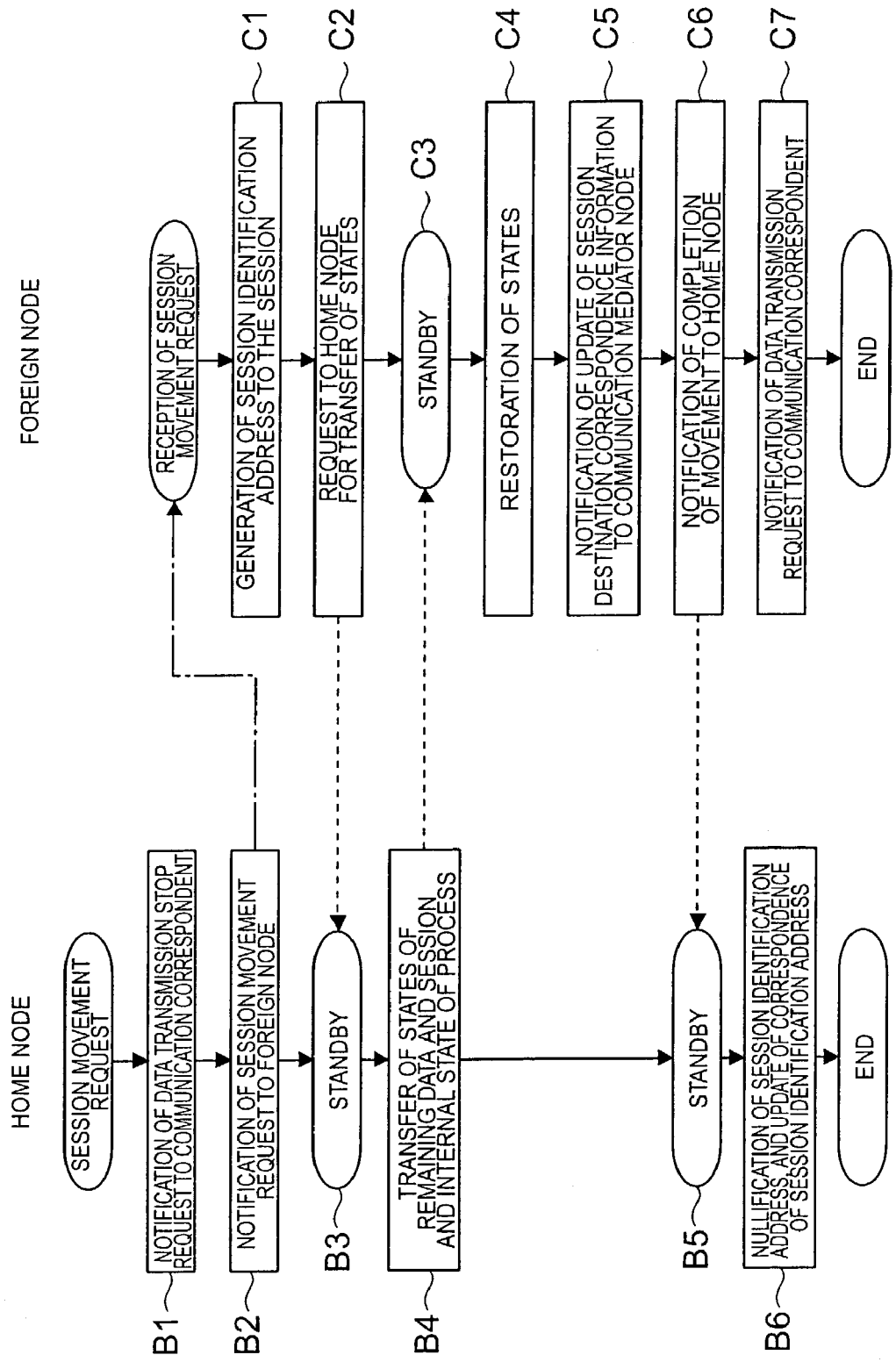

COMMUNICATION SYSTEM, COMMUNICATION CONTROLLING METHOD, COMMUNICATION NODE, COMMUNICATION MEDIATOR NODE, COMMUNICATION MEDIATING PROGRAM, SESSION MOVING METHOD, AND SESSION MOVING PROGRAM

BACKGROUND OF THE INVENTION

1. Field of the Invention

The present invention relates to a communication system for implementing movement of a session in communication between communication nodes, a communication controlling method in the communication system, a communication node and a communication mediator node constituting the communication system, a communication mediating program executed by a computer in the communication mediator node, and a session moving program executed by a computer in the communication node and a session moving method.

2. Related Background Art

Among the conventional communication methods of TCP/IP and others, there existed no standard method of moving a session in communication from one communication node to another communication node. Therefore, movement of a session in communication was individually handled in such a way that an application explicitly disconnected the session in communication and then reconnected the session in another communication node. In addition, mechanisms of moving the session were dependent upon respective applications, and thus there existed no common platform. Accordingly, there were strong desires for construction of a common platform for moving a communication session.

In order to facilitate the construction of the common platform, it is necessary to provide a standard method for moving a communication session between communication nodes without special awareness of a communication correspondent and to provide a network with a mechanism capable of facilitating the movement of the communication session without any change in the specifications of the communication correspondent.

The above mechanism requires the following three elements. Namely, the three elements are ① a mechanism for ensuring reachability of data (a mechanism of, after a communication correspondent of a certain communication session sends data, delivering the data to a node of a destination to which the communication session has moved), ② a mechanism for ensuring continuity of the session (a mechanism of, in order to continue the session at the destination as well, on the occasion of movement of the session, copying an interior state on the way of the session in communication, into the destination node and restoring the interior state on the way of the session in the destination node), and ③ a mechanism for ensuring continuity of a process (a mechanism of copying an interior state of an application process in communication, into the destination node and restoring the interior state of the process in the destination node).

The element ① (the mechanism for ensuring reachability of data) among these elements is such a mechanism that, while a communication session is established between one communication node and a communication correspondent, even if one end of the communication session moves from one communication node to another communication node, the communication correspondent is allowed to send data to the one communication node and the data thereafter can be surely delivered to the other communication node as a destination of the communication session, and it can be said as an indispensable and important element.

The present invention has been accomplished with focus on the above element ①, and an object of the present invention is to provide a communication system, a communication controlling method, a communication node, a communication mediator node, a communication. mediating program, a session moving method, and a session moving program capable of ensuring the reachability of data even with movement of a communication session between communication nodes.

SUMMARY OF THE INVENTION

In order to achieve the above object, a communication system according to the present invention is a communication system comprising a plurality of communication nodes, a communication device of a communication correspondent in communication with one communication node selected from the plurality of communication nodes, and a communication mediator node configured to mediate communication, and implementing movement of a session in the communication between the communication nodes, wherein each of the plurality of communication nodes comprises as functions of a source communication node of a session: session managing means for allocating a session identification address for identifying a session, to each session at the time of starting communication, and for managing a correspondence of the session identification address to each session; and movement notifying means for, on the occasion of movement of a session, notifying a destination communication node of the session, of the movement of the session; and comprises as a function of a destination communication node of a session; first update notifying means configured so that when the communication node is notified of movement of a session by another communication node, the first update notifying means generates a session identification address corresponding to the session and notifies the communication mediator node of update data about session destination correspondence information indicating a correspondence between the session identification address and a node identification address of a destination; and wherein the communication mediator node comprises: first managing means for managing the session destination correspondence information and for updating the session destination correspondence information on the basis of the update data about the session destination correspondence information; and first tunneling means for encapsulating data and transferring the encapsulated data to a session identification address of a session having moved, on the basis of the session destination correspondence information after updated.

In this communication system, the following operation is performed where a session between one communication node and the communication device of the communication correspondent is moved between communication nodes.

Namely, in the source communication node of the session (the one communication node), the session managing means allocates a session identification address for identification of the session to each session at the time of starting communication and manages the correspondence of the session identification address to the session. On the occasion of movement of the session, the movement notifying means then notifies the destination communication node of the session, of the movement of the session. The above session identification address can be an identification address area similar to an address used as a node identification address. In this case the data destined for the session identification address is transferred in the network while basically being handled in the same manner as the data destined for the node identification address.

In the destination communication node of the session, when receiving the notification of the movement of the session, the first update notifying means generates the session identification address corresponding to the session and notifies the communication mediator node of the update data about the session destination correspondence information indicating the correspondence between the session identification address and the node identification address of the destination.

In the communication mediator node, the first managing means manages the session destination correspondence information and, when notified of the update data about the session destination correspondence information, it updates the session destination correspondence information on the basis of the update data. Then the first tunneling means encapsulates data and transfers the encapsulated data to the session identification address of the session having moved, on the basis of the session destination correspondence information after updated.

As described above, even if the communication session moves between communication nodes, the data from the communication device of the communication correspondent to the source communication node of the session is surely transferred to the destination communication node of the session, whereby the reachability of data can be ensured while the communication correspondent is not aware of the movement of the session. This also facilitates the construction of the platform for movement of the session between communication nodes.

The mutual communication between the communication nodes (including the source and destination), the communication device of the communication correspondent, and the communication mediator node constituting the communication system may be wireless communication or wire communication.

The above communication system is preferably configured so that the communication device of the communication correspondent comprises: first managing means for managing the session destination correspondence information and for updating the session destination correspondence information on the basis of the update data about the session destination correspondence information; and first tunneling means for encapsulating data and transferring the encapsulated data to a session identification address of a session having moved, on the basis of the session destination correspondence information after updated.

In this case, in the communication device of the communication correspondent, instead of the communication mediator node, the first managing means manages the session destination correspondence information and, when notified of the update data about the session destination correspondence information, it updates the session destination correspondence information on the basis of the update data. Then the first tunneling means encapsulates data and directly transfers the encapsulated data without intervention of the communication mediator node to the session identification address of the session having moved, on the basis of the session destination correspondence information after updated. For this reason, the processing load can be reduced on the communication mediator node, the reachability of data can be ensured even after the movement of the communication session, and the communication route can be optimized.

The communication system according to the present invention is preferably configured so that each of the plurality of communication nodes further comprises: second update notifying means for notifying the communication mediator node of update data about node destination correspondence information indicating a correspondence between a node prefix of a node identification address and a care-of address of a foreign link of a destination, and so that the communication mediator node further comprises: second managing means for managing the node destination correspondence information and for updating the node destination correspondence information on the basis of the update data about the node destination correspondence information; and second tunneling means for encapsulating data and transferring the encapsulated data to a destination of a communication node having moved, on the basis of the node destination correspondence information after updated. The above node prefix refers to a part indicating only a network identifier and a node identifier in the node identification address.

In this case, the reachability of data can also be ensured in the following manner in the case where the communication node in continuation of the session moves to a foreign link. Namely, in the communication node in continuation of the session, the second update notifying means notifies the communication mediator node of the update data about the node destination correspondence information indicating the correspondence between the node prefix of the node identification address and the care-of address of the foreign link of the destination. The communication node acquires the care-of address of the foreign link of the destination from the foreign link on the basis of the scheme of Mobile IP v6.

In the communication mediator node, the second managing means manages the node destination correspondence information and, when notified of the update data about the node destination correspondence information, it updates the node destination correspondence information on the basis of the update data. Then the second tunneling means encapsulates data and transfers the encapsulated data to the destination of the communication node having moved (the care-of address of the foreign link of the destination), on the basis of the node destination correspondence information after updated.

Namely, the communication mediator node of the present invention does not employ the way of managing the correspondence between the node identification address and the care-of address of the foreign link of the destination as in Mobile IP v6, but manages the correspondence between the node prefix of the node identification address and the care-of address of the foreign link of the destination (the node destination correspondence information), which is different from the scheme of Mobile IP v6.

As described above, even if the communication node in continuation of the session moves to the foreign link, the data from the communication device of the communication correspondent to the communication node is surely transferred to the care-of address of the foreign link of the destination, whereby the reachability of data can be ensured.

The communication system is preferably configured so that the communication device of the communication correspondent further comprises: second managing means for managing the node destination correspondence information and for updating the node destination correspondence information on the basis of the update data about the node destination correspondence information; and second tunneling means for encapsulating data and transferring the encapsulated data to a destination of a communication node having moved, on the basis of the node destination correspondence information after updated.

In this case, in the communication device of the communication correspondent, instead of the communication mediator node, the second managing means manages the node destination correspondence information and, when notified of the update data about the node destination correspondence information, it updates the node destination correspondence information on the basis of the update data. Then the second tunneling means encapsulates data and directly transfers the encapsulated data without intervention of the communication mediator node to the destination of the communication node having moved (i.e., the care-of address of the foreign link of the destination), on the basis of the node destination correspondence information after updated. For this reason, the processing load can be reduced on the communication mediator node, the reachability of data can also be ensured after the movement of the communication node, and the communication route can be optimized.

The communication system according to the present invention is preferably configured so that each of the plurality of communication nodes further comprises: translation correspondence information notifying means for notifying the communication mediator node of translation correspondence information on a translation from session-identifiable information to a session identification address and so that the communication mediator node further comprises: third managing means for managing the translation correspondence information; and third tunneling means for encapsulating data and transferring the encapsulated data to the session address according to the translation specified by the translation correspondence information.

In this case, the reachability of data can also be ensured in the following manner in the case where a session is started from the communication device of the communication correspondent. Namely, in the communication node, when receiving a communication start request from the communication device of the communication correspondent, the session managing means allocates the session identification address for identifying the session, to each session at the time of starting communication and manages the correspondence between the session identification address and the session. Then the translation correspondence information notifying means notifies the communication mediator node of the translation correspondence information on the translation from session-identifiable information to the session identification address.

In the communication mediator node, the third managing means manages the translation correspondence information and, when notified of the translation correspondence information by the communication node, the third tunneling means encapsulates data and transfers the encapsulated data to the session address according to the translation specified by the translation correspondence information.

As described above, even in the case where the session is started from the communication device of the communication correspondent, the data from the communication device of the communication correspondent to the communication node is surely transferred to the session address according to the translation specified by the translation correspondence information, whereby the reachability of data can be ensured.

The communication system is preferably configured so that the communication device of the communication correspondent further comprises: third managing means for managing the translation correspondence information; and third tunneling means for encapsulating data and transferring the encapsulated data to the session address according to the translation specified by the translation correspondence information.

In this case, in the communication device of the communication correspondent, instead of the communication mediator node, the third managing means manages the translation correspondence information and, when notified of the translation correspondence information by the communication node, the third tunneling means encapsulates data and directly transfers the encapsulated data without intervention of the communication mediator node to the session address according to the translation specified by the translation correspondence information. For this reason, the processing load can be reduced on the communication mediator node, the reachability of data from the communication device of the communication correspondent to the communication node can be ensured even in the case where the session is started from the communication device of the communication correspondent, and the communication route can be optimized.

The above communication system is characterized in that the communication session is a session identified by a combination of four items of a local address, a local port, a remote address, and a remote port defined by the transport layer of layer 4. Namely, it is possible to apply TCP (Transmission Control Protocol), UDP (User Datagram Protocol) without a start and an end, RTP (Transport Protocol for Real-Time Applications) including the concept of the session, etc. to the communication session.

Incidentally, the present invention can also be grasped from aspects of the invention of a communication controlling method, a communication node, and a communication mediator node in the communication system, as well as the aspect of the invention of the communication system, while achieving like operation and effect. Namely, the invention can be described as follows.

A communication controlling method according to the present invention is a communication controlling method used in a communication system comprising a plurality of communication nodes, a communication device of a communication correspondent in communication with one communication node selected from the plurality of communication nodes, and a communication mediator node for mediating communication, and used for implementing movement of a session in the communication between communication nodes, wherein a source communication node of a session operates to: allocate a session identification address for identifying a session, to each session at the time of starting communication, and manage a correspondence of the session identification address to each session; and, on the occasion of movement of a session, notify a destination communication node of the session, of the movement of the session; wherein a destination communication node of the session operates to: when notified of the movement of the session by the source communication node of the session, generate a session identification address corresponding to the session and notify the communication mediator node of update data about session destination correspondence information indicating a correspondence between the session identification address and a node identification address of a destination; and wherein the communication mediator node operates to: manage the session is destination correspondence information and, when notified of the update data about the session destination correspondence information, update the session destination correspondence information on the basis of the update data; and encapsulate data and transfer the encapsulated data to the session identification address of the session having moved, on the basis of the session destination correspondence information after updated.

In this case, preferably, instead of the communication mediator node, the communication device of the communication correspondent operates to: manage the session destination correspondence information and, when notified of the update data about the session destination correspondence information, update the session destination correspondence information on the basis of the update data; and encapsulate data and transfer the encapsulated data to the session identification address of the session having moved, on the basis of the session destination correspondence information after updated.

Another communication controlling method according to the present invention is a communication controlling method used in a communication system comprising a plurality of communication nodes, a communication device of a communication correspondent in communication with one communication node selected from the plurality of communication nodes, and a communication mediator node for mediating communication, and used in the case where the one communication node has moved to a foreign link, wherein the one communication node operates to: notify the communication mediator node of update data about node destination correspondence information indicating a correspondence between a node prefix of a node identification address and a care-of address of the foreign link of the destination; and wherein the communication mediator node operates to: manage the node destination correspondence information and, when notified of the update data about the node destination correspondence information, update the node destination correspondence information on the basis of the update data; and encapsulate data and transfer the encapsulated data to the destination of the communication node having moved, on the basis of the node destination correspondence information after updated.

In this case, preferably, instead of the communication mediator node, the communication device of the communication correspondent operates to: manage the node destination correspondence information and, when notified of the update data about the node destination correspondence information, update the node destination correspondence information on the basis of the update data; and encapsulate data and transfer the encapsulated data to the destination of the communication node having moved, on the basis of the node destination correspondence information after updated.

Still another communication controlling method according to the present invention is a communication controlling method used in a communication system comprising a plurality of communication nodes, a communication device as a communication correspondent, and a communication mediator node for mediating communication, and used in the case where the communication device of the communication correspondent sends a communication start request through the communication mediator node to one communication node, wherein the one communication node operates to: when receiving the communication start request, allocate a session identification address to each session and manage a correspondence of the session identification address to each session; and notify the communication mediator node of translation correspondence information on a translation from session-identifiable information to a session identification address; and wherein the communication mediator node operates to: manage the translation correspondence information from the one communication node; and encapsulate data and transfer the encapsulated data to the session address according to the translation specified by the translation correspondence information.

In this case, preferably, instead of the communication mediator node, the communication device of the communication correspondent operates to: manage the translation correspondence information from the one communication node; and encapsulate data and transfer the encapsulated data to the session address according to the translation specified by the translation correspondence information.

A communication node according to the present invention is a communication node, together with a communication device as a communication correspondent, and a communication mediator node configured to mediate communication while having a function of managing session destination correspondence information indicating a correspondence between a session identification address and a node identification address of a destination and a function of encapsulating data and transferring the encapsulated data to a session identification address of a session having moved, on the basis of the session destination correspondence information, constituting a communication system, the communication system including a plurality of such communication nodes, the communication node comprising as functions of a source communication node of a session: session managing means for allocating a session identification address for identifying a session, to each session at the time of starting communication, and for managing a correspondence of the session identification address to each session; and movement notifying means for, on the occasion of movement of a session, notifying a destination communication node of the session of movement of the session; and the communication node comprising as a function of a destination communication node of a session: first update notifying means configured so that when the communication node is notified of movement of a session by another communication node, the first update notifying means generates a session identification address corresponding to the session and notifies the communication mediator node of update data about the session destination correspondence information.

In this case, the communication node is preferably configured to further comprise such second update notifying means that, where the communication mediator node is a communication mediator node further having a function of managing node destination correspondence information indicating a correspondence between a node prefix of a node identification address and a care-of address of a foreign link of a destination and a function of encapsulating data and transferring the encapsulated data to a destination of a communication node having moved, on the basis of the node destination correspondence information, the second update notifying means notifies the communication mediator node of update data about the node destination correspondence information.

The communication node is also preferably configured to further comprise such translation correspondence information notifying means that, where the communication mediator node is a communication mediator node further having a function of managing translation correspondence information on a translation from session-identifiable information to a session identification address and a function of encapsulating data and transferring the encapsulated data to a session address according to the correspondence specified by the translation correspondence information, the translation correspondence information notifying means notifies the communication mediator node of the translation correspondence information on the translation from session-identifiable information to the session identification address.

A communication mediator node according to the present invention is a communication mediator node for mediating communication, constituting a communication system with a communication device as a communication correspondent, and a plurality of communication nodes having as functions of a source communication node of a session, functions of allocating a session identification address for identifying a session, to each session at the time of starting communication and managing a correspondence of the session identification address to each session and a function of, on the occasion of movement of a session, notifying a destination communication node of the session, of the movement of the session, and having as functions of a destination communication node of a session, functions of, when notified of movement of a session by another communication node, generating a session identification address corresponding to the session and notifying the communication mediator node of update data about the session movement correspondence information, the communication mediator node comprising: first managing means for managing the session destination correspondence information and for updating the session destination correspondence information on the basis of the update data about the session destination correspondence information; and first tunneling means for encapsulating data and transferring the encapsulated data to a session identification address of a session having moved, on the basis of the session destination correspondence information after updated.

In this case, the communication mediator node is preferably configured to constitute the communication system with the communication nodes further having as a function of a destination communication node of a session, a function of notifying the communication mediator node of update data about node destination correspondence information indicating a correspondence between a node prefix of a node identification address and a care-of address of a foreign link of a destination, and further comprise: second managing means for managing the node destination correspondence information and for updating the node destination correspondence information on the basis of update data about the node destination correspondence information; and second tunneling means for encapsulating data and transferring the encapsulated data to a destination of a communication node having moved, on the basis of the node destination correspondence information after updated.

The communication mediator node is preferably configured to further comprise: third managing means for managing translation correspondence information on a translation from session-identifiable information to a session identification address, notified of by the communication node; and third tunneling means for encapsulating data and transferring the encapsulated data to a session address according to the translation specified by the translation correspondence information.

A first communication mediating program according to the present invention is a communication mediating program to be executed by a computer incorporated in a communication mediator node, the communication mediator node constituting a communication system with a communication device as a communication correspondent, and a plurality of communication nodes having as functions of a source communication node of a session, functions of allocating a session identification address for identifying a session, to each session at the time of starting communication and managing a correspondence of the session identification address to each session and a function of, on the occasion of movement of a session, notifying a destination communication node of the session, of the movement of the session, and having as functions of a destination communication node of a session, functions of, when notified of movement of a session by another communication node, generating a session identification address corresponding to the session and notifying the communication mediator node of update data about the session movement correspondence information, and the communication mediator node operating to mediate communication and manage the session destination correspondence information, the communication mediating program letting the computer execute: a session destination correspondence update receiving step of receiving update data about the session destination correspondence information from the communication node: a session destination correspondence updating step of updating the session destination correspondence information on the basis of the update data about the session destination correspondence information received; and a session destination tunneling step of encapsulating data and transferring the encapsulated data to a session identification address of a session having moved, on the basis of the session destination correspondence information after updated.

The processing of the above communication mediating program is executed in the specific processing flow shown in FIG. 10. Namely, the processing of FIG. 10 is started in response to a trigger of reception of a packet, and it is determined whether the packet is a packet about update of session destination correspondence information (A1). If the packet is a packet about update of session destination correspondence information, the session destination correspondence information is updated on the basis of the content of the packet (A2). Then the steps A3-A6 described later are carried out.

When a packet including transmit data is received thereafter, the step A1 results in negative determination and the flow proceeds to A3 to search for the session destination correspondence information about a destination of the packet (A3). It is then determined whether there is corresponding information as the session destination correspondence information (A4). If there is the corresponding information, the data is encapsulated to obtain packet data addressed to the destination of the session on the basis of the corresponding session destination correspondence information (A5), and the routing process to the destination of the session is carried out (A6) If there is no corresponding information in A4, no encapsulation is conducted and the routing process is carried out (A6).

A second communication mediating program according to the present invention is to be executed by a computer incorporated in a communication mediator node, the communication mediator node constituting a communication system with the communication nodes further having as a function of a destination communication node of a session, notifying the communication mediator node of update data about node destination correspondence information indicating a correspondence between a node prefix of a node identification address and a care-of address of a foreign link of a destination, and the communication mediator node operating to manage the node destination correspondence information, and the communication mediating program is configured to let the computer execute: a node destination correspondence update receiving step of receiving update information about the node destination correspondence information from the communication node; a node destination correspondence updating step of updating the node destination correspondence information on the basis of the update data about the node destination correspondence information received; and; a node destination tunneling step of encapsulating data and transferring the encapsulated data to a destination of the communication node having moved, on the basis of the node destination correspondence information after updated.

Furthermore, a third communication mediating program according to the present invention is to be executed by a computer incorporated in a communication mediator node operating to manage translation correspondence information on a translation from session-identifiable information to a session identification address, and the communication mediating program is configured to let the computer execute: a translation correspondence receiving step of receiving the translation correspondence information from the communication node; a translation correspondence updating step of updating the translation correspondence information of a management target on the basis of the translation correspondence information received; and a translation correspondence tunneling step of encapsulating data and transferring the encapsulated data to a session address according to the translation specified by the translation correspondence information after updated.

The processing of the above second and third communication mediating programs is also executed in processing flows similar to the aforementioned specific processing flow shown in FIG. 10.

A session moving method according to the present invention is a session moving method used in a communication system comprising a plurality of communication nodes, a communication device of a communication correspondent in communication with one communication node selected from the plurality of communication nodes, and a communication mediator node for mediating communication, in which the communication nodes have functions of, when notified of movement of a session by another communication node, generating a session identification address corresponding to the session and notifying the communication mediator node of update data about session destination correspondence information indicating a correspondence between the session identification address and a node identification address of a destination and in which the communication mediator node has functions of managing the session destination correspondence information; when notified of the update data about the session destination correspondence information, updating the session destination correspondence information on the basis of the update data; and encapsulating data and transferring the encapsulated data to a session identification address of a session having moved, on the basis of the session destination correspondence information after updated, the session moving method being executed in a destination communication node, for implementing movement of a session in communication between communication nodes, and the session moving method comprising the steps of: allocating a session identification address for identifying a session, to each session at the time of starting communication; managing a correspondence of the session identification address to each session; and on the occasion of movement of a session, notifying a destination communication node of the session, of the movement of the session.

Another session moving method is a session moving method used in a communication system comprising a plurality of communication nodes, a communication device of a communication correspondent in communication with one communication node selected from the plurality of communication nodes, and a communication mediator node for mediating communication, in which the communication nodes have functions of allocating a session identification address for identifying a session, to each session at the time of starting communication, managing a correspondence of the session identification address to each session, and, on the occasion of movement of a session to another communication node, notifying the other communication node of the destination, of the movement of the session and in which the communication mediator node has functions of managing session destination correspondence information indicating a correspondence between the session identification address and a node identification address of the destination; when notified of update data about the session destination correspondence information, updating the session destination correspondence information on the basis of the update data; and encapsulating data and transferring the encapsulated data to a session identification address of a session having moved, on the basis of the session destination correspondence information after updated, the session moving method being executed in a destination communication node, for implementing movement of a session in communication between communication nodes, and the session moving method comprising the steps of: receiving a movement notification of a session from a source communication node; generating a session identification address corresponding to the session; and notifying the communication mediator node of update data about the session destination correspondence information indicating a correspondence between the session identification address and a node identification address of its own node.

A session moving program according to the present invention is a session moving program used in a communication system comprising a plurality of communication nodes, a communication device of a communication correspondent in communication with one communication node selected from the plurality of communication nodes, and a communication mediator node for mediating communication, in which the communication nodes have functions of, when notified of movement of a session by another communication node, generating a session identification address corresponding to the session and notifying the communication mediator node of update data about session destination correspondence information indicating a correspondence between the session identification address and a node identification address of a destination and in which the communication mediator node has functions of managing the session destination correspondence information; when notified of the update data about the session destination correspondence information, updating the session destination correspondence information on the basis of the update data; and encapsulating data and transferring the encapsulated data to a session identification address of a session having moved, on the basis of the session destination correspondence information after updated, the session moving program being executed by a computer incorporated in a source communication node, for implementing movement of a session in communication between communication nodes, and the session moving program letting the computer execute: an address allocating step of allocating a session identification address for identifying a session, to each session at the time of starting communication; a managing step of managing a correspondence of the session identification address to each session; and a movement notifying step of, on the occasion of movement of a session, notifying a destination communication node of the session, of the movement of the session.

Another session moving program according to the present invention is a session moving program used in a communication system comprising a plurality of communication nodes, a communication device of a communication correspondent in communication with one communication node selected from the plurality of communication nodes, and a communication mediator node for mediating communication, in which the communication nodes have functions of allocating a session identification address for identifying a session, to each session at the time of starting communication, managing a correspondence of the session identification address to each session, and, on the occasion of movement of a session to another communication node, notifying the other communication node of the destination, of the movement of the session and in which the communication mediator node has functions of managing session destination correspondence information indicating a correspondence between the session identification address and a node identification address of the destination; when notified of update data about the session destination correspondence information, updating the session destination correspondence information on the basis of the update data; and encapsulating data and transferring the encapsulated data to a session identification address of a session having moved, on the basis of the session destination correspondence information after updated, the session moving program being executed by a computer incorporated in a destination communication node, for implementing movement of a session in communication between communication nodes, and the session moving program letting the computer execute: a receiving step of receiving a movement notification of a session from a source communication node; an address generating step of generating a session identification address corresponding to the session; and an update notifying step of notifying the communication mediator node of update data about the session destination correspondence information indicating a correspondence between the session identification address and a node identification address of its own node.

An example of processing to which the invention associated with the above session moving programs will be described on the basis of FIG. 11. In the source communication node (home node), processing is started in reply to occurrence of a session movement request. The home node first sends a data transmission stop request to the communication correspondent (B1), then sends a session movement request to a destination communication node (foreign node) (B2), and goes into a standby state (B3).

In the destination communication node (foreign node), processing is started in reply to reception of the session movement request. The foreign node first generates a session identification address for the session (C1), requests the home node to transfer states (states of data and session remaining in the home node and the interior state of the application process, described previously) (C2), and goes into a standby state (C3).

When receiving the transfer request of the states from the foreign node, the home node recovers from the standby state and transfers the states of the data and session remaining in its own node and the interior state of the application process (B4), and then goes into a standby state (B5).

The foreign node recovers from the standby state in reply to a trigger of the transfer of the above states from the home node, restores the above states (C4), and notifies a communication mediator node of update of the session destination correspondence information (C5). Then the foreign node notifies the home node of completion of the transfer (C6), sends a data transmission request to the communication correspondent (C7), and ends the processing.

When receiving the notification of completion of the transfer from the foreign node, the home node recovers from the standby state, discards the session identification address and updates the correspondence relation of the session identification address (B6), and ends the processing.

BRIEF DESCRIPTION OF THE DRAWINGS

FIG. 11 is a flowchart for explaining the processing of the session moving program executed in the source and destination communication nodes in order to move a session.

DESCRIPTION OF THE PREFERRED EMBODIMENTS

Embodiments of the present invention will be described below in detail with reference to the drawings.

[System Configuration]

Figure 1:
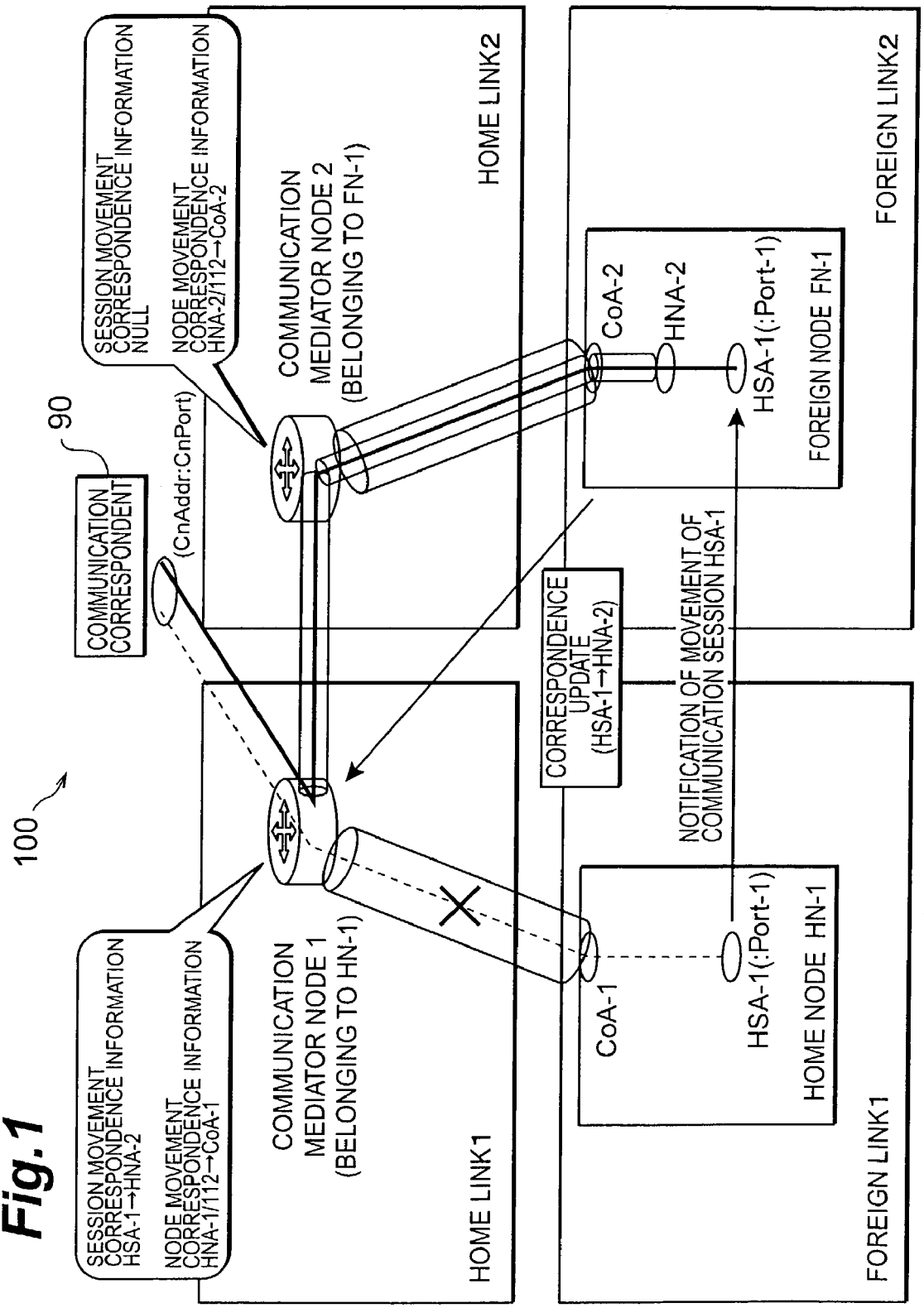
FIG. 1 is a diagram showing the configuration of the communication system and the operation in movement of the communication session.
Figure 2:
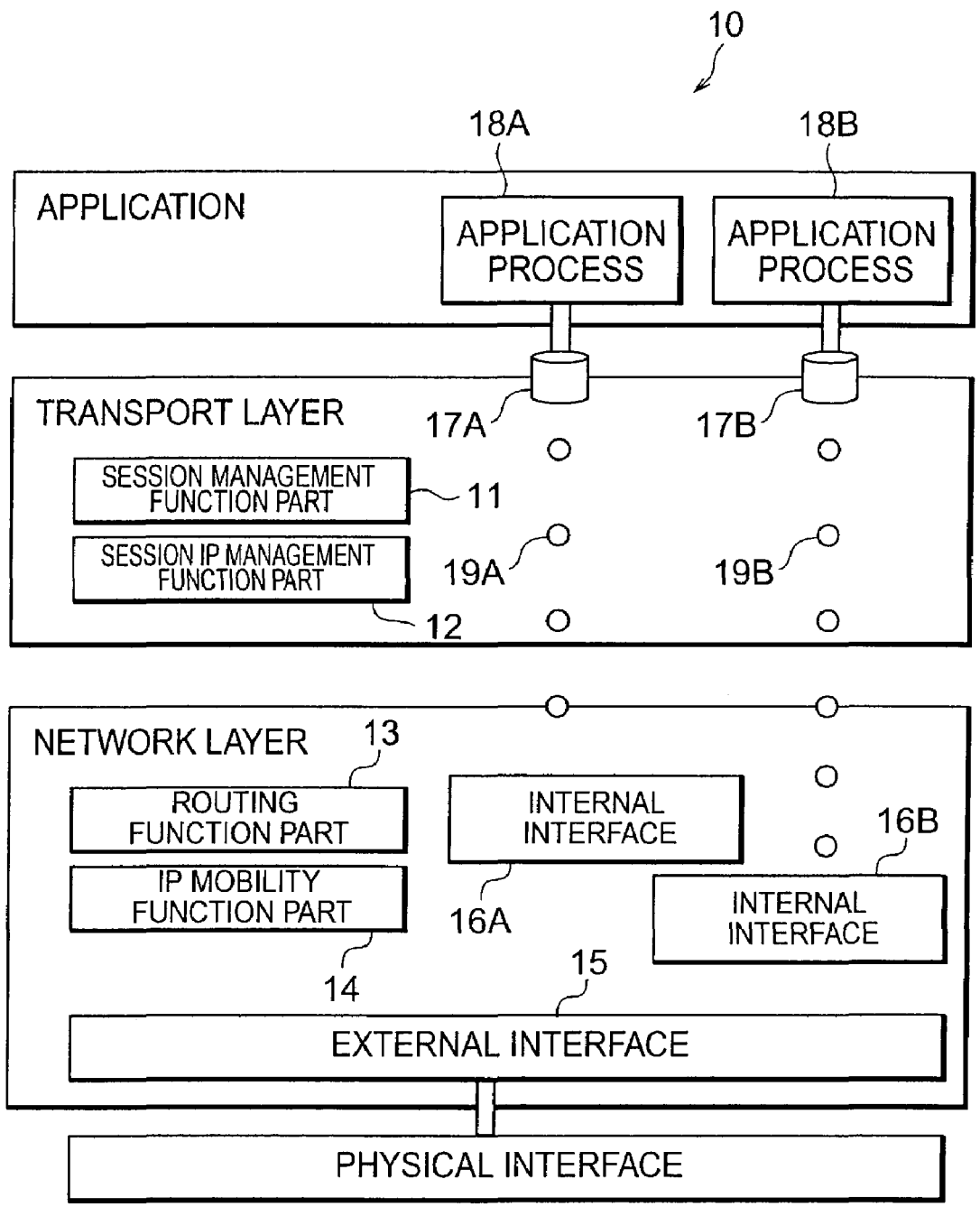
FIG. 2 is a diagram showing the major part of the configuration of the communication node.
Figure 3:
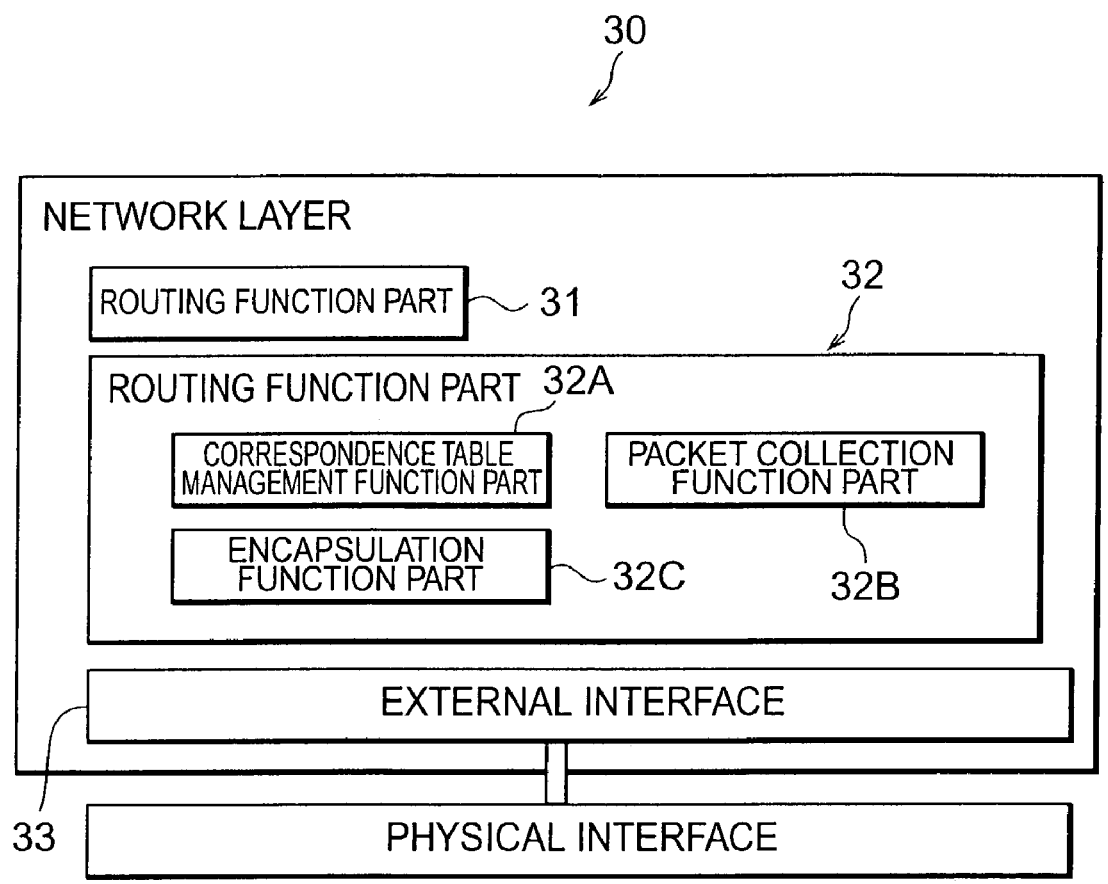
FIG. 3 is a diagram showing the major part of the configuration of the communication mediator node.

The communication system of the present embodiment is comprised of a plurality of communication nodes, a communication device of a communication correspondent which carries out communication with one communication node selected from the plurality of communication nodes, and a communication mediator node to mediate communication, and permits movement of a session in communication between communication nodes by mechanisms described later. For example, the communication system 100 shown in FIG. 1 is comprised of a plurality of communication nodes HN-1, FN-1, a communication device 90 of a communication correspondent, and communication mediator nodes 1, 2. FIG. 2 shows the major part of the configuration of each communication node forming this communication system and FIG. 3 shows the major part of the configuration of each communication mediator node. Among the communication nodes, a communication node having originated a session will be referred to as a "home node," and the other communication nodes as "foreign nodes."

The mutual communication between the communication nodes HN-1, FN-1, the communication device 90 of the communication correspondent, and the communication mediator nodes 1, 2 constituting the communication system 100 may be wireless communication or wire communication.

Figure 4:
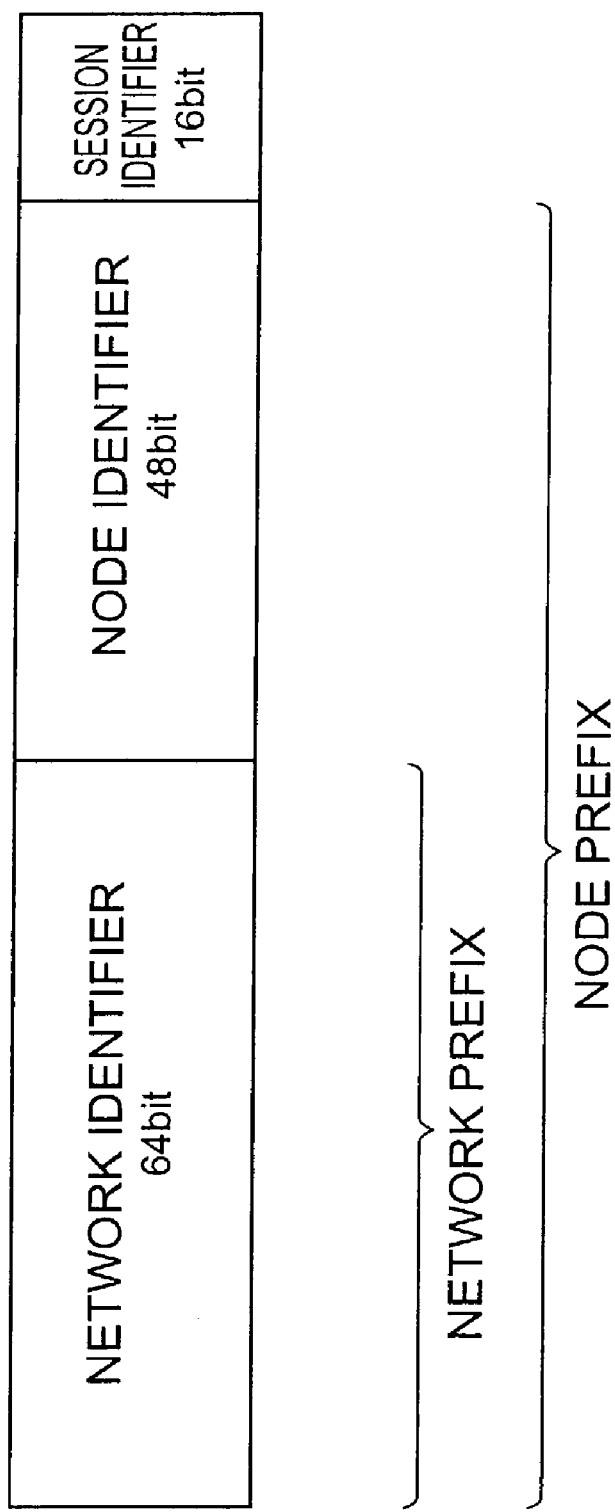
FIG. 4 is a diagram showing the architecture of the IP address used in identification of the communication session.

FIG. 4 shows the architecture of an IP address utilized in identification of each communication session in the present embodiment. The architecture of the IP address employed in the present proposal includes a node identifier for identifying a communication node and a session identifier for identifying a session of each communication node. The home node is assigned a home node identification address for identifying the node (hereinafter referred to as "HNA") by a link to which the home node belongs (a home link), and in this HNA the session identifier is 0.

The home node is able to allocate a unique home session address (hereinafter referred to as "HSA") to each communication session by managing the session identifier. When IP v6 is applied to the IP address architecture of HSA, upper 64 bits are assigned to the network identifier, subsequent 48 bits to the node identifier, and lower 16 bits to the session identifier as shown in FIG. 4. It is assumed that addresses with the session identifier of 0x0000 (all 0) in hexadecimal designate addresses of the home node itself (HNA) that generated those sessions. The upper 64 bits of this IP address will be called a network prefix and the upper 112 bits a node prefix.

As shown in FIG. 2, the communication node 10 is provided with session management function part 11 and session IP management function part 12 as function parts of the transport layer and with routing function part 13, IP mobility function part 14, external interface 15 adapted to a physical interface with the outside, and internal interfaces 16A, 16B as function parts of the network layer.

Among these, the session management function part 11 has functions of management of port numbers, management of sessions, conversion of packet and data streams, etc., and the session IP management function part 12 has functions of assignment and management of HSA, correspondence between HSA and session, and so on. The routing function part 13 has a function of routing to a desired node, and other functions, and the IP mobility function part 14 has functions of update of node correspondence, update of session correspondence, and notification of translation correspondence information to a communication mediator node, a function of restoring an encapsulated packet, and a function of notifying a destination communication node of movement of a session.

The above session IP management function part 12 corresponds to the session managing means according to the present invention, and the IP mobility function part 14 to the first update notifying means, the second update notifying means, the translation correspondence information notifying means, and the movement notifying means.

In the communication node 10, a packet coming from the network is received by the external interface 15, the packet thereafter is decapsulated to extract original packets 19A, 19B therefrom, and then the packets are received by the internal interfaces 16A, 16B. The internal interface 16A hands over the packet 19A through socket 17A to application process 18A. Likewise, the internal interface 16B hands over the packet 19B through socket 17B to application process 18B. The application process 18A outputs data without encapsulation through the socket 17A, the output data is encapsulated in the transport layer, and the encapsulated data thereafter is sent from the external interface 15 to the network.

Figure 5:
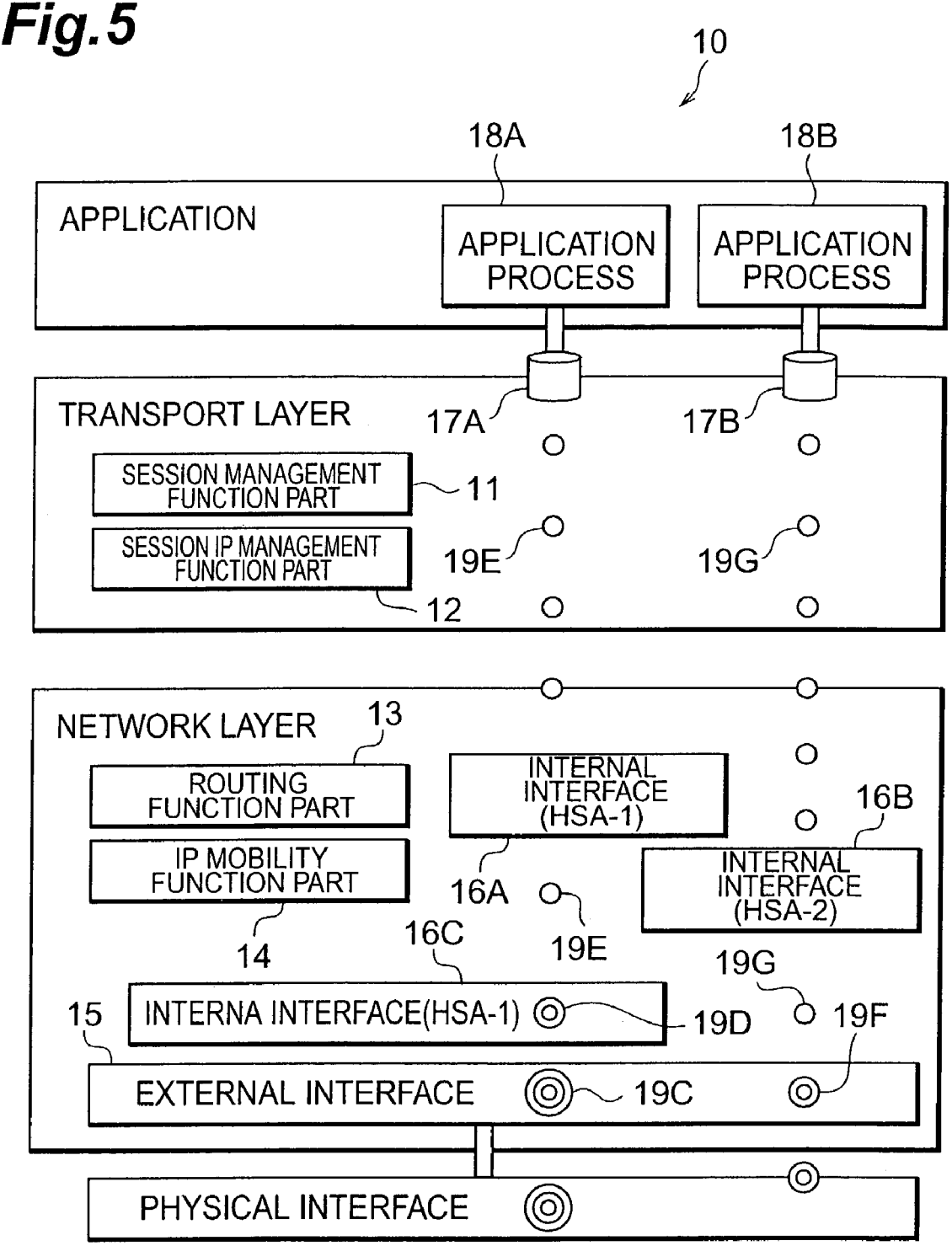
FIG. 5 is a diagram showing the flow of packet reception in the case where the communication node is located in the foreign link.

Packet reception flows in the communication node 10 will be described below using FIGS. 5 and 6. FIG. 5 shows a case where the communication node 10 is located in a foreign link, in which a flow of packet reception with the communication node 10 functioning as a foreign node to a communication session is indicated by packets 19C, 19D, and 19E and in which a flow of packet reception with the communication node 10 functioning as a home node to a communication session is indicated by packets 19F, 19G.

When the communication node 10 functions as a foreign node to a communication session, decapsulation of a packet (i.e., a decapsulating process) is carried out in such a manner that a packet 19C coming up to the external interface 15 under the care-of address CoA-1 is decapsulated to extract a packet 19D addressed to HNA-1 therefrom. Then the internal interface 16C receives the packet 19D addressed to HNA-1 and decapsulates the packet 19D to extract a packet 19E addressed to HSA-1. Then the internal interface 16A receives the packet 19E addressed to HSA-1, and thereafter hands over the packet data to the socket 17A bound thereto. In this flow the decapsulation is carried out twice.

On the other hand, when the communication node 10 functions as a home node to a communication session, decapsulation of a packet is carried out in such a manner that a packet 19F coming up to the external interface 15 under the care-of address CoA-1 is decapsulated to extract a packet 19G addressed to HSA-2 therefrom. Then the internal interface 16B receives the packet 19G addressed to HSA-2 and thereafter hands over the packet data to the socket 17B bound thereto. In this flow the decapsulation is carried out only once.

Figure 6:
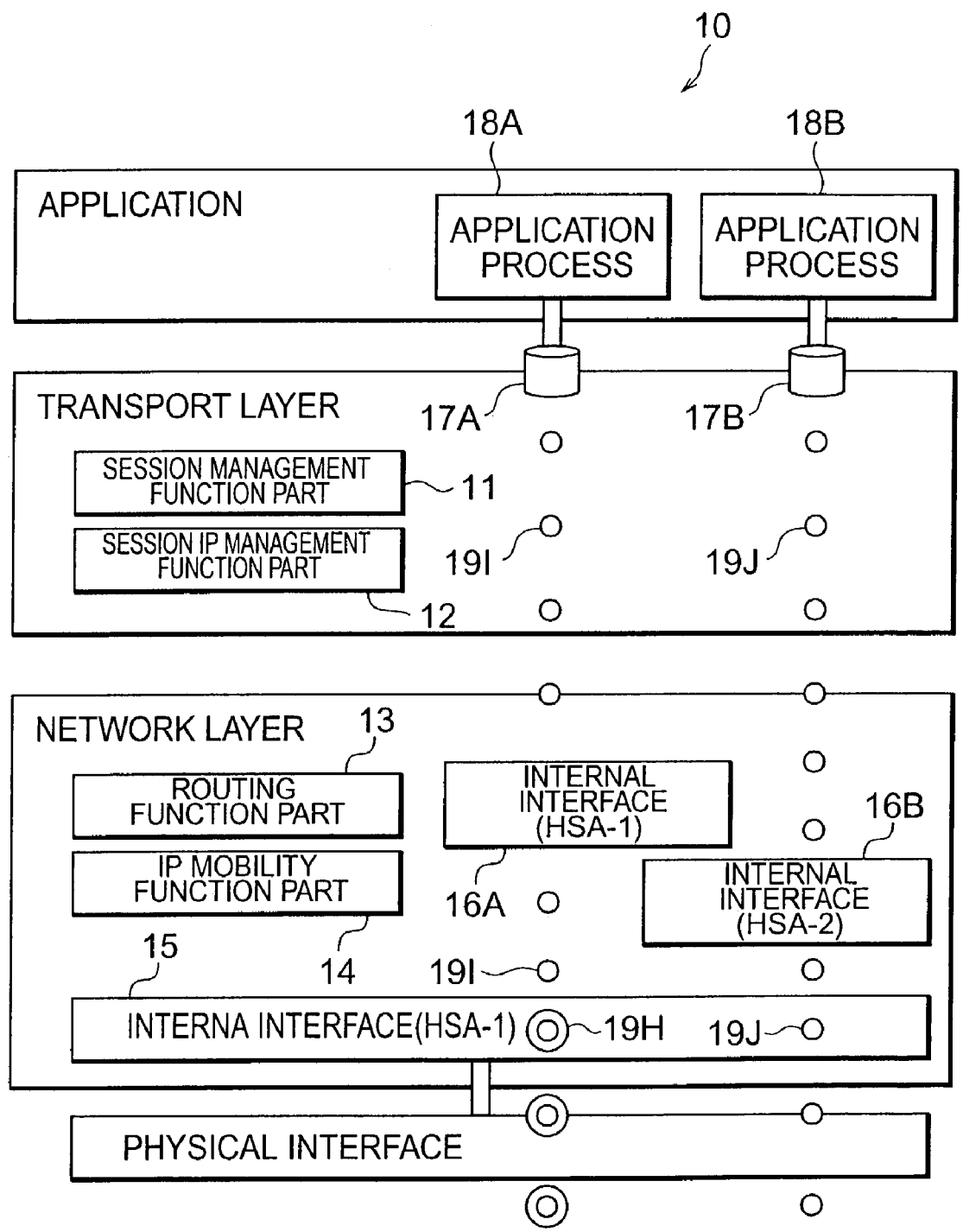
FIG. 6 is a diagram showing the flow of packet reception in the case where the communication node is located in the home link.

FIG. 6 shows a case where the communication node 10 is located in the home link, in which a flow of packet reception with the communication node 10 functioning as a foreign node to a communication session is indicated by packets 19H, 19I and in which a flow of packet reception with the communication node 10 functioning as a home node to a communication session is indicated by a packet 19J. When the communication node 10 functions as a foreign node to a communication session, decapsulation of a packet is carried out in such a way that the external interface 15 itself is HNA (the internal interfaces 16 are only HSA), because the communication node 10 is located in the home link, and a packet 19H coming up to the external interface 15 under HNA-1 is decapsulated there to extract a packet 19I addressed to HSA-1 therefrom. Then the internal interface 16A receives the packet 19I addressed to HSA-1 and thereafter hands over the packet data to the socket 17A bound thereto. In this flow the decapsulation is carried out only once. When the communication node 10 functions as a home node to a communication session, no decapsulation of packet is carried out.

Incidentally, as shown in FIG. 3, the communication mediator node 30 is provided with routing function part 31, mobility function part 32, and external interface 33 adapted to the physical interface with the outside, as function parts of the network layer. The mobility function part 32 is comprised of correspondence table management function part 32A, packet collection function part 32B, and encapsulation function part 32C.

The routing function part 31 has a function of transferring a packet so as to make it reachable to a desired node, and other functions, and the correspondence table management function part 32A has functions of creating session destination correspondence information indicating a correspondence between HSA and a node identification address of a destination and managing the destination of the communication session by the session destination correspondence information thus created, functions of creating node destination correspondence information indicating a correspondence between a node prefix (upper 112 bits) of a node identification address and a care-of address of a foreign link of a destination and managing the destination of the communication node by the node destination correspondence information thus created, and a function of managing translation correspondence information on a translation from session-identifiable information (e.g., information of a combination of four items, a local address, a local port, a remote address, and a remote port) to HSA. The packet collection function part 32B has a function of collecting packets to an IP address of a communication session having moved, and other functions, and the encapsulation function part 32C has a function of effecting tunneling of a packet to a destination on the basis of the session destination correspondence information, node destination correspondence information, and translation correspondence information, and other functions.

The above correspondence table management function part 32A corresponds to the first to third managing means according to the present invention, and the encapsulation function part 32C to the first to third tunneling means.

[Operation in Movement of Session]

FIG. 1 shows the operation in the case where the communication session HSA-1 of the home node HN-1 moves to the foreign node FN-1. The home node HN-1 belongs to the home link 1, and has the home node identification address HNA-1 with the same network prefix as the home link 1. Since the home node HN-1 lies in the foreign link 1 at present, it has the care-of address CoA-1 with the same network prefix as the foreign link 1.

The operation of the communication mediator node described below is implemented by operation of a communication mediating program in the communication mediator node. The operation of the home node is implemented by operation of a source communication program in the home node, and the operation of the foreign node by operation of a destination communication program in the foreign node.

The communication mediator node 1 of the home link 1 has the node destination correspondence information "an address with the same node prefix as the home node identification address HNA-1 is tunneled to the care-of address CoA-1" (which will be indicated hereinafter by "HNA-1/112→CoA-1"), based on correspondence notification information of the home node HN-1, collects packets addressed to the address with the same node prefix as the home node identification address HNA-1, encapsulates the collected packets, and transfers the packet capsule to the care-of address CoA-1.

Similarly, it is assumed that the foreign node FN-1 belongs to the home link 2, has the home node identification address HNA-2 with the same network prefix as the home link 2, lies in the foreign link 2 at present, and thus has the care-of address CoA-2 with the same network prefix as the foreign link 2.

The communication mediator node 2 of the home link 2 has the node movement correspondence information "an address with the same node prefix as the home node identification address HNA-2 is tunneled to the care-of address CoA-2" (which will be indicated hereinafter by "HNA-2/112→CoA-2"), based on correspondence notification information of the foreign node FN-1, collects packets addressed to the address with the same node prefix as the home node identification address HNA-2, encapsulates the collected packets, and transfers the packet capsule to the care-of address CoA-2.

The above "HNA-1/112" represents the upper 112 bits of HNA-1, i.e., the node prefix. "HNA-1/64" indicates the upper 64 bits of HNA-1, i.e., the network prefix.

The home node HN-1 generates the home session address HSA-1 and establishes the communication session HSA-1:Port-1 with the communication correspondent CnAddr:CnPort. When the communication mediator node 1 receives the data addressed to HSA-1, it encapsulates the data and transfers the encapsulated data to the care-of address CoA-1 on the basis of the node movement correspondence information of "HNA-1/112→CoA-1." When the packet arrives at the care-of address CoA-1 of the home node HN-1, it is decapsulated, and each packet is transferred to HSA-1 inside the home node HN-1 and finally received by the interface of HSA-1.

On the occasion of movement of the session, the home node HN-1 notifies the foreign node FN-1 that it desires to move the session in communication under HSA-1 to the foreign node FN-1. The foreign node FN-1 receiving this notification internally generates the IP address HSA-1 and copies the state of the communication session from CnAddr:CnPort in the home node HN-1 to HSA-1:Port-1. The home node HN-1 records the fact that HSA-1 has moved to the foreign node FN-1, in order to manage the session address generated by itself, and deletes HSA-1 of the home node HN-1. This can avoid redundancy of the IP address.

In order to make the data to HSA-1 reachable to the foreign node FN-1, the foreign node FN-1 notifies the communication mediator node 1 to which the home node HN-1 being an original holder of HSA-1 belongs, of correspondence update information "HSA-1 →HNA-2," so as to effect tunneling of data addressed to HSA-1 to the home node identification address HNA-2. The communication mediator node 1 receiving the notification performs tunneling of data to the home node identification address HNA-2 (i.e., encapsulates the data and transfers the encapsulated data) on the basis of the correspondence update information. The data passed by tunneling to HNA-2 is again passed by tunneling to the care-of address CoA-2 by the communication mediator node 2.

Through this operation, the communication device of the communication correspondent sends data addressed to HSA-1:Port-1, the communication mediator node 1 and the communication mediator node 2 relay the data to pass it to the foreign node FN-1 by tunneling, and thus the session HSA-1:Port-1 of the foreign node FN-1 can receive the data, which ensures continuation of communication.

When the session corresponding to HSA-1 ends in the aforementioned foreign node FN-1, it notifies the communication mediator node 1 and the home node HN-1 of cancellation of the registration of HSA-1 and the home node HN-1 liberates HSA-1 managed heretofore thereby.

Since the data from the communication correspondent to the home node HN-1 is surely transferred to the foreign node FN-1 even in the case where the communication session moves from the home node HN-1 to the foreign node FN-1, as described above, the reachability of data can be ensured while the communication correspondent is not aware of the movement of the session. This facilitates the construction of the platform for movement of the session between communication nodes.

[Operation in Movement of Communication Node to Foreign Link]

Figure 7:
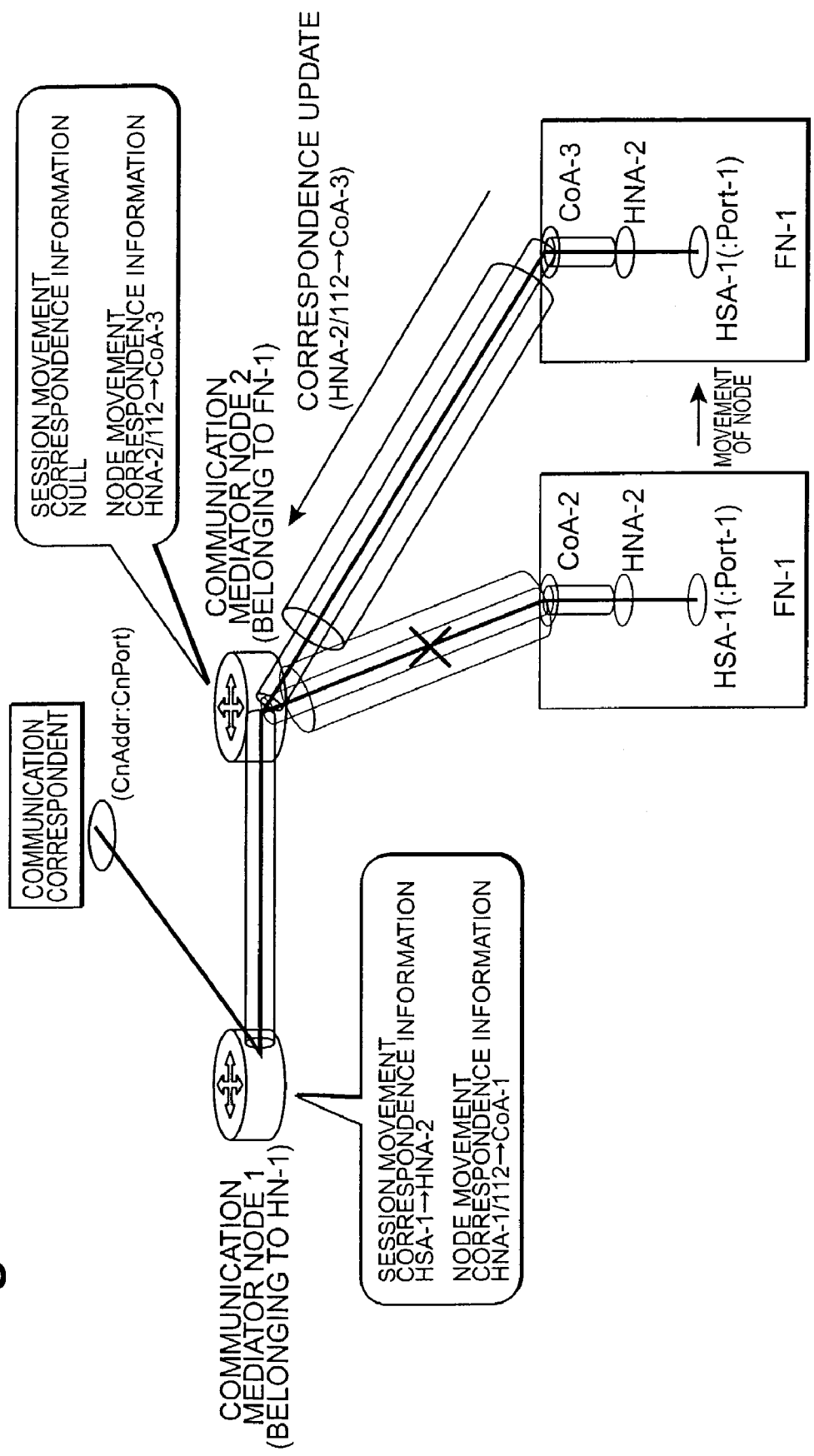
FIG. 7 is a diagram showing the operation in the case where the foreign node has moved to another foreign link.

FIG. 7 shows the operation in the case where the foreign node FN-1 has moved to another foreign link. The foreign node FN-1 acquires the care-of address CoA-3 from the foreign link of the destination on the basis of the scheme of Mobile IP v6, and notifies the communication mediator node 2 of correspondence update about the node destination correspondence information indicating the correspondence between the node prefix of the node identification address and the care-of address of the foreign link of the destination (HNA-2/112→CoA-3), in order to enable tunneling of data addressed to the home node identification address HNA-2, to the care-of address CoA-3.

The communication mediator node 2 manages the node destination correspondence information and, when notified of the above correspondence update, it updates the node destination correspondence information on the basis of the correspondence update. The communication mediator node 2 passes the data addressed to the home node identification address HNA-2, to the care-of address CoA-3 by tunneling on the basis of the node destination correspondence information after updated. Through this operation, the data addressed to the home node identification address HNA-2 surely reaches the foreign node FN-1 after the movement.

On this occasion, there appears no notification about HSA-1. The communication mediator node 1 simply transfers the data addressed to HSA-1, to the home node identification address HNA-2, and the communication mediator node 2 transfers the data to the actual care-of address CoA-3 by retunneling. Therefore, the communication mediator node 1 does not have to know where the foreign node FN-1 is actually located. This is the reason why the session destination correspondence information is not the correspondence to the care-of address but the correspondence to the home node identification address.

As described above, the data from the communication correspondent to the foreign node FN-1 is surely transferred to the care-of address CoA-3 of the foreign link of the destination even in the case where the foreign node FN-1 in continuation of the session moves to another foreign link, whereby the reachability of data can be ensured.

[Operation in Start of Communication Session from Home Node]

The operation is a start of a communication session from the home node will be described below referring to FIG. 8. The communication session is started by exchange of communication start requests (SYN) and communication start responses (ACK) between two nodes.

Figure 8:
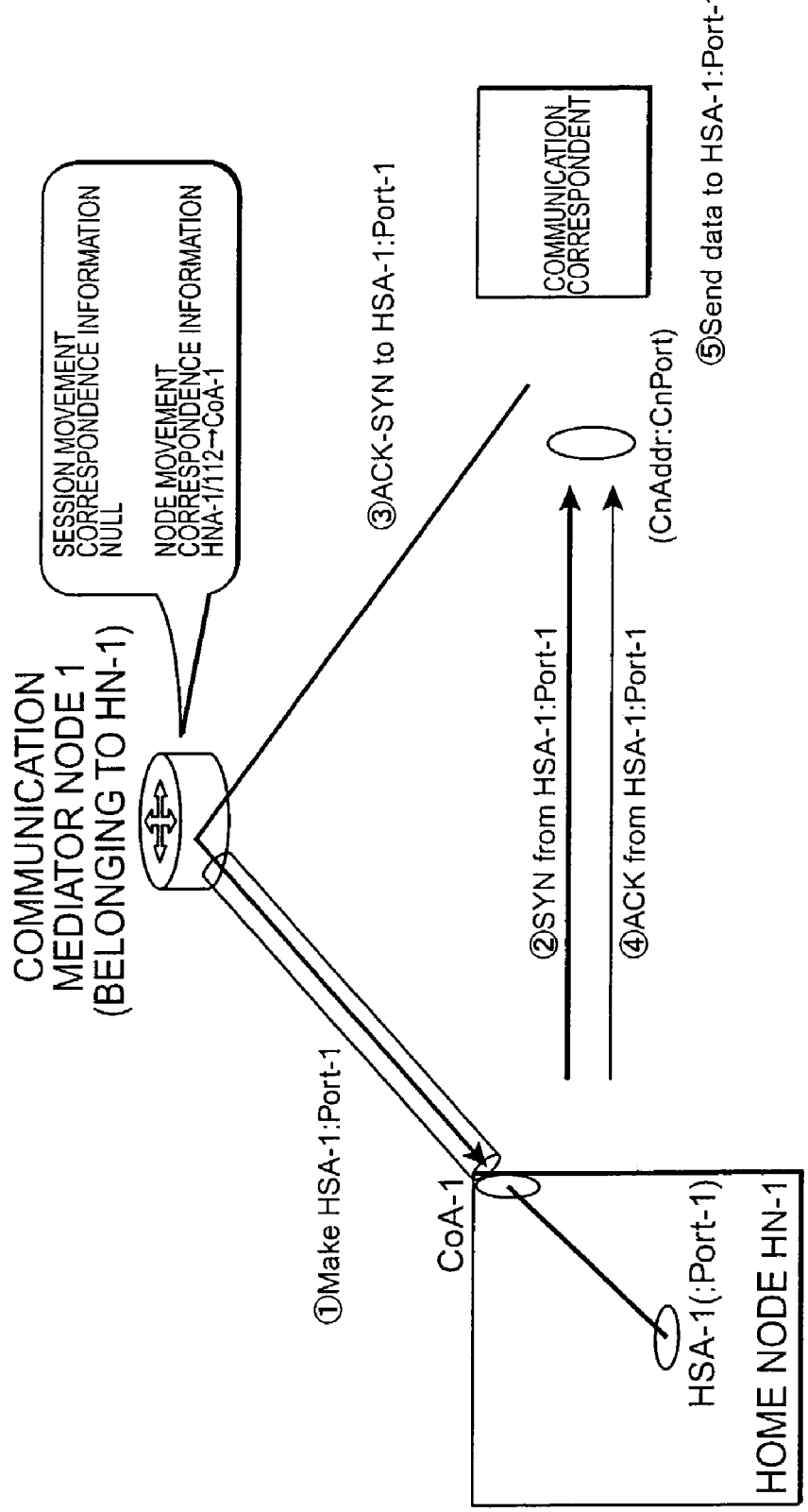
FIG. 8 is a diagram showing the operation in the start of the communication session from the home node.

The home node HN-1 generates a session address HSA-1 and a port number Port-1 at the time of a start of a session (step ① in FIG. 8), and sends a communication start request SYN from Port-1 of HSA-1 to the port CnPort of the communication correspondent CnAddr (step ② in FIG. 8). Although the home node HN-1 generated HSA-1, it does not have to notify the communication mediator node 1 of HSA-1. The reason for it is that the communication mediator node 1 passes a packet to the care-of address by tunneling, not on the basis of HSA-1, but on the basis of the node prefix.

When the communication correspondent receives the communication start request SYN, it sends a communication start response ACK to HSA-1:Port-1 of the source of the request and simultaneously sends a communication start request SYN thereto (step ③ in FIG. 8). The home node HN-1 sends a communication start response ACK to the communication start request SYN coming from the communication correspondent (step ④ in FIG. 8), and thereafter data can be transmitted and received between HSA-1:Port-1 and CnAddr:CnPort (step ⑤ in FIG. 8).

In this way, the processing is surely carried out for the start of the communication session and the start of transmission and reception of data based on the origination from the home node.

[Operation in Start of Communication Session from Communication Correspondent]

The operation in a start of a communication session from the communication correspondent will be described below referring to FIG. 9. The communication correspondent knows the address HNA-1 designating HN-1 and the port Port-1 of service and sends a communication start request SYN to HNA-1:Port-1 (step ① in FIG. 9).

Figure 9:
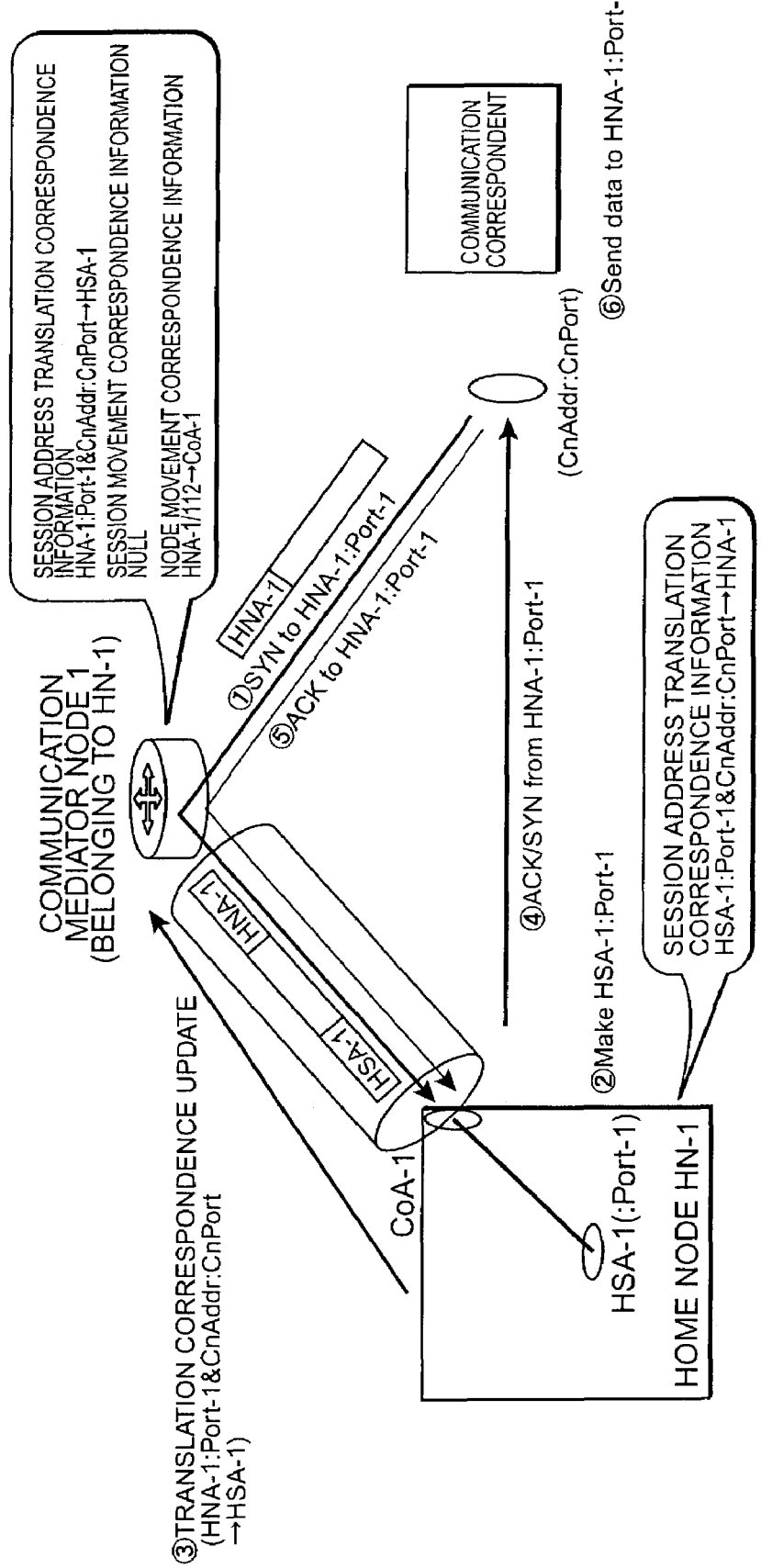
FIG. 9 is a diagram showing the operation in the start of the communication session from the communication correspondent.
Figure 10:
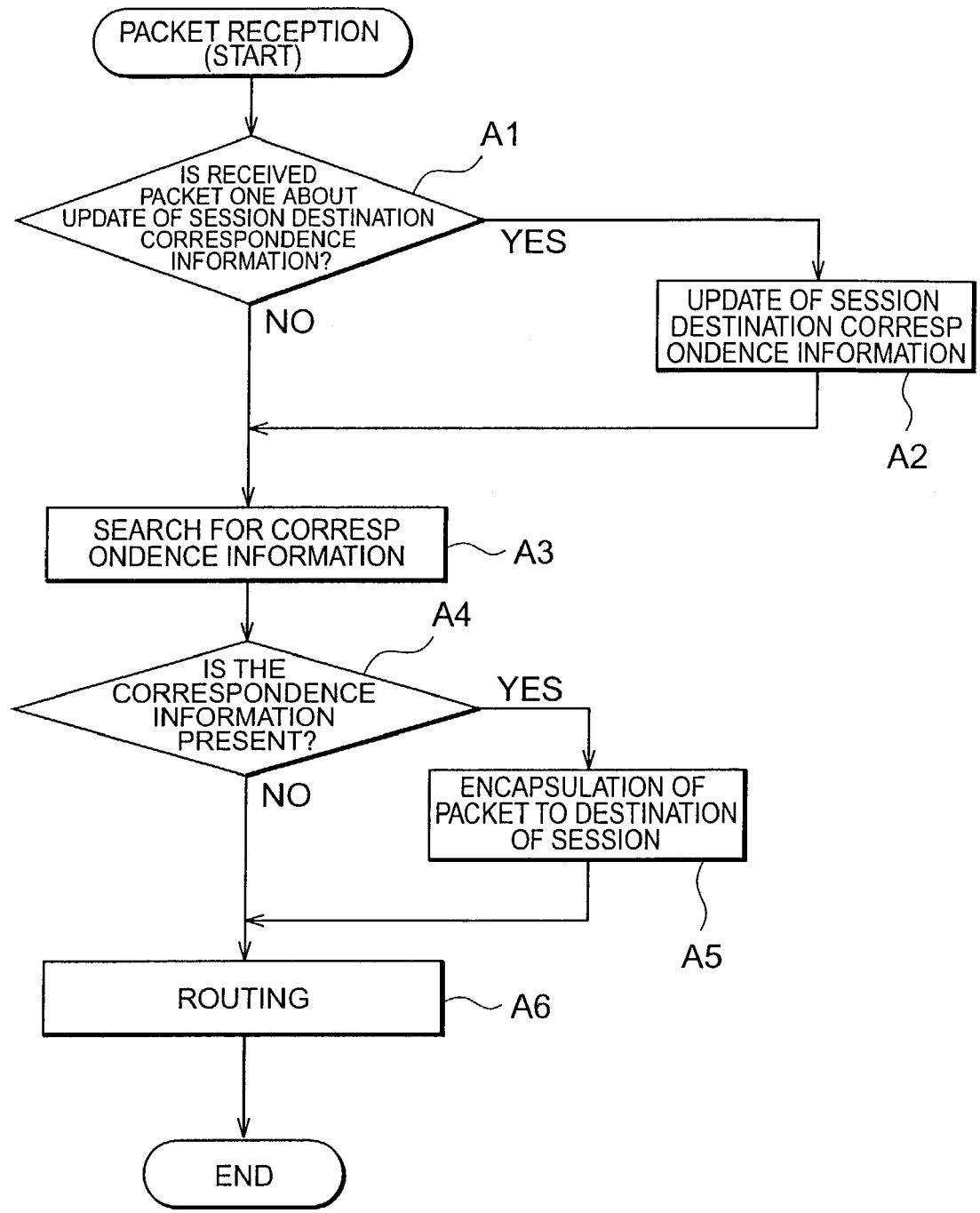
FIG. 10 is a flowchart for explaining the processing of the communication mediating program according to the present invention.

The home node HN-1 receives the session start request, generates a new IP address HSA-1 for the session, and accepts the request for the session by HSA-1 and Port-1 (step ② in FIG. 9).

In order to make data hereinafter reach HSA-1, the home node HN-1 registers first translation correspondence information for a translation of each packet from CnAddr:CnPort to HN-1:Port-1 into one to HSA-1, in the communication mediator node 1 (step ③ in FIG. 9). At this time, the home node HN-1 registers second translation correspondence information for a reverse translation of each packet from HSA-1:Port-1 to CnAddr:CnPort into one originated from HNA-1, in the home node HN-1 itself.

Then the home node HN-1 sends a communication start response ACK and a communication start request SYN from HNA-1:Port-1 to CnAddr:CnPort (step ④ in FIG. 9). The communication correspondent returns a communication start response ACK to HNA-1:Port-1 (step ⑤ in FIG. 9) to establish a session. Communication thereafter is carried out between HNA-1:Port-1 and CnAddr:CnPort, and the communication mediator node 1 translates the data into one addressed to HSA-1 and transfers it to HSA-1 (to the home node HN-1) (step ⑥ in FIG. 9). When the home node HN-1 lies in a foreign link, the data is again passed by tunneling (encapsulated and transferred) to the care-of address CoA-1 by the communication mediator node 1

In the case of starting the communication session based on origination from the communication correspondent, the data from the communication correspondent to the home node HN-1 is also surely transferred to the session address HSA-1 according to the translation specified by the above first translation correspondence information as described above, whereby the reachability of data can be ensured.

Incidentally, the correspondence information registered in the communication mediator node is generally classified under the following three types, as shown in FIG. 9.

The first correspondence information is correspondence information for a translation of a destination of packets in each session from the home node identification address to the home session address (session address translation correspondence information, e.g., HNA-1:Port 1+CnAddr: CnPort→HSA 1), which is generated when the home node receives a session start request.

The second correspondence information is correspondence information between the home session address and the home node identification address of the foreign node (session destination correspondence information, e.g., HSA-1→HNA-2), which is used in the case where the session has moved from the home node to the foreign node.

The third correspondence information is correspondence information between the node prefix and the care-of address (node destination correspondence information, e.g., HNA- 1/112→CoA-1), which is used in the case where the communication node has moved to the foreign link. These are searched for in the following order: the first correspondence information, the second correspondence information, and the third correspondence information.

The communication correspondent does not always have to be provided with the function for movement of the session, but it can enjoy the following advantage if it is provided with the function for movement of the session. Namely, when the system is so configured that the communication correspondent is provided with the function of directly encapsulating a packet and transferring the encapsulated packet and that the communication correspondent is also notified similarly of the correspondence update of which the moving communication node notifies the communication mediator node, the data from the communication correspondent can be directly delivered to the communication node without passing the communication mediator node, whereby the communication route can be optimized. This effect of capability of optimizing the communication route can be achieved in each of the above operation in movement of the session (FIG. 1), operation in movement of the communication node to the foreign link (FIG. 7), and operations in the start of the communication session (FIG. 8 and FIG. 9).

The information items classified under the above second correspondence information and third correspondence information in the correspondence update to the communication correspondent are updated in a consolidated form. For example, the session movement correspondence update "HSA-1→HNA-2" sent to the communication mediator node 1 in FIG. 1 and the node movement correspondence update "HNA-2/112→CoA-3" sent to the communication mediator node 2 in FIG. 7 are assumed to be updated in the form of consolidated update information "HSA-1→CoA-3" thereof when the communication correspondent is notified of them. Namely, in the correspondence table about the session destination held by the communication correspondent, the registration and update are effected, not in the form of "home session address → home node identification address of foreign node", but in the form of "home session address → care-of address of foreign node".

Incidentally, a session is generally established between a client and a server. An example of movement of a session from a client to another client is a video conference system or the like. Specifically, a conceivable example is such that a session of a video conference is established in a certain PC client to receive information, the session is moved to PDA of another client, and a user goes out while continuing the video conference.

The description heretofore showed the examples in which the communication session moved between communication nodes on the client side, but there are also conceivable applications in which the client is fixed while the server of the communication correspondent transfers the communication session to another server. In such cases, the client does not have to be provided with the functions adaptable to the movement of the session, but the servers need to be provided with the functions adaptable to the movement of the session between them. An application example is that the session is moved for load sharing between mirror servers of files.

As described above, the present invention achieved the effect that even with movement of the communication session between communication nodes, the data from the communication device of the communication correspondent to the source communication node of the session was surely transferred to the destination communication node of the session and thus the reachability of data was ensured while the communication correspondent was not aware of the movement of the session. The invention also achieved the effect that the internal state of the session and the internal state of the application process were moved or unified, so as to maintain the communication session freely without fixing the sender or receiver to a node and without changing the communication correspondent and thus information was continuously provided/received.

What is claimed is:

1. A communication system comprising:
   a plurality of communication nodes;
   a communication correspondent in communication with one communication node selected from the plurality of communication nodes;
   a communication mediator node configured to mediate communication and implement movement of a session between source and destination communication nodes,
   each source communication node of said plurality of communication nodes comprising:
      a session managing unit configured to allocate a session identification address for identifying a session at the time of starting communication, and configured to manage an association of the session identification address to each session;
      a movement notifying unit configured to notify, on the occasion of movement of the session, a destination communication node of movement of the session,
   each destination communication node of said plurality of communication nodes comprising:
      a first update notifying unit configured to open a communication session using the session identification address corresponding to the moved session when notified of movement of a session by the source communication node and to notify said communication mediator node of the moved session using session destination correspondence information that includes information regarding a correspondence between the session identification address and a node identification address of the destination communication node, and said communication mediator node comprising:
      a first managing unit configured to manage the session destination correspondence information and to update the session destination correspondence information based on the notification by the movement notifying unit; and
      a first tunneling unit configured to encapsulate data and transfer the encapsulated data to the new session identification address of the moved session, on the basis of the updated session destination correspondence information.

2. The communication system according to claim 1, wherein the communication correspondent comprises:
   a first managing unit configured to manage the session destination correspondence information and to update the session destination correspondence information; and
   a first tunneling unit configured to encapsulate data and transfer the encapsulated data to the new session identification address of the moved session, on the basis of the updated session destination correspondence information.

3. The communication system according to claim 1, wherein each of said plurality of communication nodes further comprises:

a second update notifying unit configure to notify the communication mediator node of node destination correspondence information that includes information regarding a correspondence between a node prefix of a node identification address and a care-of address of a foreign link of a destination communication node, said communication mediator node further comprising:

a second managing unit configured to manage said node destination correspondence information and to update the node destination correspondence information; and a second tunneling unit configured to encapsulate data and transfer the encapsulated data to the destination communication node on the basis of the updated node destination correspondence information.

4. The communication system according to claim 3, wherein the communication correspondent further comprises:

a second managing unit configured to manage said node destination correspondence information and to update the node destination correspondence information; and a second tunneling unit configured to encapsulate data and transfer the encapsulated data to the destination communication node on the basis of the updated node destination correspondence information.

5. The communication system according to claim 1, wherein each of said plurality of communication nodes further comprises:

a translation correspondence information notifying unit configured to notify the communication mediator node of translation correspondence information regarding a translation from session-identifiable information to a session identification address, said communication mediator node further comprising:

a third managing unit configured to manage the translation correspondence information; and a third tunneling unit configured to encapsulate and transfer the encapsulated data to the session address according to the translation specified by the translation correspondence information.

6. The communication system according to claim 5, wherein the communication correspondent further comprises:

a third managing unit configured to manage the translation correspondence information; and a third tunneling unit configured to encapsulate data and transfer the encapsulated data to the session address according to the translation specified by the translation correspondence information.

7. The communication system according to claim 1, wherein the communication session is a session identified by a combination of a local address, a local port, a remote address, and a remote port defined by the transport layer of layer 4.

8. A communication controlling method used in a communication system comprising a plurality of communication nodes, a communication correspondent in communication with one communication node selected from the plurality of communication nodes, and a communication mediator node for mediating communication, and used for implementing movement of a session in the communication between source and destination communication nodes, comprising:

allocating to each session at the time of starting communication a session identification address for identifying a session, the allocating executed by a source communication node;

managing a correspondence of the session identification address to each session, the managing executed by the source communication node;

notifying, on the occasion of movement of the session, a destination communication node of the session of the movement of the session, the notifying executed by the source communication node;

opening a communication session using the session identification address corresponding to the session and notifying the communication mediator node of update data regarding session destination correspondence information indicating a correspondence between the session identification address and a node identification address of a destination node when notified of the movement of the session by the source communication node of the session, the opening and the notifying executed by a destination node;

managing, using the communication mediator node, the session destination correspondence information and updating the session destination correspondence information on the basis of the update data when notified of the update data, the managing executing by the communication mediator node; and encapsulating data and transferring the encapsulated data to the session identification address of the moved session on the basis of the updated session destination correspondence information, the encapsulating and the transferring executed by the communication mediator node.

9. The communication controlling method according to claim 8, comprising:

managing the session destination correspondence information and updating the session destination correspondence information on the basis of the update data when notified of the update data regarding the session destination correspondence information using the communication correspondent; and encapsulating data and transferring the encapsulated data to the session identification address of the moved session on the basis of the updated session destination correspondence information.

10. A communication controlling method used in a communication system comprising a plurality of communication nodes, a communication correspondent, and a communication mediator node for mediating communication and used in the case where the communication correspondent sends a communication start request through the communication mediator node to one communication node, comprising:

allocating a session identification address to each session when receiving the communication start request and managing an association of the session identification address to each session, the allocating executed by said one communication node;

notifying the communication mediator node of translation correspondence information regarding a translation from session-identifiable information to a session identification address, the notifying executed by said one communication node;

sending an acknowledgement from the one communication node to the communication correspondent, the acknowledgement including the session identification address;

managing the translation correspondence information from the one communication node, the managing executed by the communication mediator node; and encapsulating data and transferring the encapsulated data to the session address according to the translation specified by the translation correspondence information, the encapsulating and the transferring executed by the communication mediator node.

11. The communication controlling method according to claim 10, comprising:

managing the translation correspondence information from the one communication node using the communication correspondent; and encapsulating data and transferring the encapsulated data to the session address according to the translation specified by the translation correspondence information using the communication correspondent.

12. A communication system, comprising:

a source communication node;

a destination communication node;

a communication correspondent;

a communication mediator node configured to mediate communication, manage session destination correspondence information indicating a correspondence between a session identification address and a node identification address of the destination node, encapsulate data, and transfer the encapsulated data to a session identification address of a moved session on the basis of the session destination correspondence information which constitutes a communication system, said communication system including a plurality of communication nodes, the source communication node comprising:

a session managing unit configured to allocate a session identification address for identifying a session to each session at the time of starting communication, and configured to manage a correspondence of the session identification address to each session; and a movement notifying unit configured to notify the destination node of the session of the movement of the session on an occasion of movement of the session;

the destination node comprising:

a first update notifying unit configured to open a communication session using the session identification address corresponding to the session with the destination node when the destination node is notified of movement of a session by the source communication node and notify the communication mediator node of updated session destination correspondence information.

13. The communication node according to claim 12, further comprising:

a communication mediator node configured to manage node destination correspondence information indicating a correspondence between a node prefix of a node identification address and a care-of address of a foreign link of a destination, configured to encapsulate data and configured to transfer the encapsulated data to a destination of a moved communication node on the basis of the node destination correspondence information; and a second update notifying unit configured to notify the communication mediator node of update data regarding the node destination correspondence information.

14. The communication node according to claim 13, further comprising:

a communication mediator node configured to manage translation correspondence information of a translation from session-identifiable information to a session identification address, encapsulate data and transfer the encapsulated data to a session address according to the translation specified by the translation correspondence information; and a translation correspondence information notifying unit configured to notify the communication mediator node of the translation correspondence information of the translation from session-identifiable information to the session identification address.

* * * * *